United States Patent [19]
Rehrig

[11] Patent Number: 4,946,059
[45] Date of Patent: Aug. 7, 1990

[54] REINFORCED PLASTIC BASKET

[75] Inventor: Houston Rehrig, Pasadena, Calif.

[73] Assignees: Rehrig International, Inc., Richmond, Va.; Rehrig-Pacific Co., Inc., Los Angeles, Calif.

[21] Appl. No.: 389,323

[22] Filed: Aug. 3, 1989

Related U.S. Application Data

[62] Division of Ser. No. 177,453, Apr. 4, 1988, Pat. No. 4,865,338.

[51] Int. Cl.⁵ ............................................. B62B 3/02
[52] U.S. Cl. ....................................... 220/73; 220/71; 280/33.992
[58] Field of Search .............. 220/71, 73; 280/33.992

[56] References Cited

U.S. PATENT DOCUMENTS

| | | | |
|---|---|---|---|
| D. 209,865 | 1/1968 | Rehrig et al. | D58/5 |
| 2,876,498 | 3/1959 | Nason | 18/59 |
| 3,341,060 | 9/1967 | Rehrig et al. | 220/73 |
| 3,390,808 | 7/1968 | Rehrig et al. | 220/71 |
| 3,419,182 | 12/1968 | Gildart | 220/73 |
| 3,445,034 | 5/1969 | Rehrig | 220/97 |
| 3,622,037 | 11/1971 | Gildart | 220/73 |
| 3,999,774 | 12/1976 | Rehrig | 280/33.991 |
| 4,123,077 | 10/1978 | Joseph | 280/33.990 |
| 4,273,346 | 6/1981 | Rehrig | 280/33.996 |
| 4,412,628 | 11/1983 | Whitney | 220/73 X |
| 4,500,007 | 2/1985 | Stoll, III | 220/73 X |
| 4,619,371 | 10/1986 | Rehrig | 220/71 |
| 4,865,338 | 9/1989 | Rehrig | 280/33.992 |

FOREIGN PATENT DOCUMENTS 1520906 8/1978 United Kingdom .

*Primary Examiner*—Steven M. Pollard
*Attorney, Agent, or Firm*—Banner, Birch, McKie & Beckett

[57] ABSTRACT

The present invention is directed to a plastic container having a reinforcing ring disposed around its upper edges to provide additional strength. The reinforcing ring is preferably formed of a cross-sectionally round wire which is obtained from a coil, straightened, cut, and bent to suitable dimensions. If desired, the reinforcing ring may have its ends welded together and the ring may extend around the entire top opening. The reinforcing ring is disposed within a peripheral outwardly facing channel of the shopping cart basket, crate, or other container. The channel includes top and bottom walls and an inner side wall. The reinforcing ring is free of projections that engage the walls of the channel. The channel has retaining ridges and/or a plurality of resilient discrete projections which retain the reinforcing ring and enable the reinforcing ring to be snap-actingly receivable within the channel.

10 Claims, 2 Drawing Sheets

REINFORCED PLASTIC BASKET

This application is a division of application Ser. No. 07/177,453, filed Apr. 4, 1988, now patent No. 4,865,338.

TECHNICAL FIELD

The present invention relates to an improved reinforcing ring and retaining structure for carts, crates, and other storage containers. More particularly, the present invention relates to a reinforcing ring that is free of projections and which snap-actingly fits within a channel disposed along the top opening of plastic shopping carts, milk crates, and storage containers.

BACKGROUND OF THE INVENTION

Carts having a frame and a basket used in supermarkets are commonplace. Ideally, carts of this type should have the following characteristics. First, they should be able to withstand a great deal of abuse, particularly to the basket portion. Carts are continuously impacted with each other and with stationary objects. Second, the carts should be easy to push and to maneuver. The condition of the wheels has a great effect on this characteristic as does the weight of the cart. Third, the carts should be of such design and surface finish to avoid a propensity to collect dirt and contaminants. Fourth, the carts should be able to withstand cleaning by strong detergents or steam. Fifth, the carts usually must have sides of open lattice construction, because customers wish to be able to observe the contents of the carts from any angle. Sixth, the carts should be attractive and should maintain their attractiveness over a long period of time.

Carts with metal baskets do not satisfy all of these requirements. The wires in the baskets are welded at the crossing points, and the basket is chrome-plated to provide a smooth, cleanable, attractive surface. Because the welding and plating process is intricate, it is common to have welds and plating of marginal quality so that, upon hard impact or upon a series of impacts over a period of time, the welds and plating are broken. The plating is also subject to being removed by wear and scraping against other objects. This allows the base metal to rust. Also, if the basket is used in an environment where corrosion of metals is a problem, such as in grocery stores, the base metal exposed at the broken plating and broken welds will corrode. The cart, and particularly the basket, then becomes unsightly and unattractive. At these exposed points, food particles can become entrapped in small cracks and crevices despite periodic cleaning, yielding unsanitary carts. In addition, articles placed in the basket can become pinched or snared by the unsecured wires and plating, in conveniencing the customer and damaging the goods. Impacts also frequently inwardly deform the basket, giving rise to all of the above problems.

Repair of metal cart baskets is a problem because it is difficult to bend the wires back into shape, and it is difficult and expensive to reweld and replate the wires. The cart frame and the basket are often integral with each other and therefore cannot easily be taken apart for repair or replacement of components. To replace the basket, welds must be broken, then replaced. Complicated bending and interlocking of wires frequently is necessary during disassembly and assembly. Usually, the cart is simply not repaired. When it becomes too unsightly or too unsanitary to use it is discarded. The loss of the entire cart for the sake of the basket is uneconomical. Metal carts are also quite heavy, making them difficult to push and to maneuver, especially if they have some malfunction of the wheels.

Carts having plastic baskets have been used to overcome many of the disadvantages of metal basket carts. Such a cart is disclosed in my U.S. Pat. No. 3,999,774 entitled "Cart With Plastic Basket." In such carts the frame is preferably made of chrome plated steel construction and the the cart basket is made of plastic, such as polyethylene. This basket is strong, light-weight, has a smooth finish, and can deform to absorb impact and then return to its original shape. The sides, front and bottom of the plastic basket are integrally molded in one piece. There are no seams to break, or cracks and crevices to collect dirt. The plastic does not rust or corrode under the influence of food acids and other chemicals. The use of a plastic basket reduces the weight of an average cart by at least fifteen pounds.

The plastic basket is formed almost entirely of open lattice construction, which further lightens it, and which allows the basket contents to be viewed from any angle. Rigidity is provided to the basket by suitable integral strengthening ribs, and also by the interrelationship between the basket and the metal cart frame, and other components.

It is very important to have a strong basket that will withstand impact and high loading. Therefore, the basket must be provided with reinforcement. Some reinforcement is provided by way of the construction of the basket itself. But the weight of the basket is kept to a minimum, and its strength maximized, by novel relationships between the metal cart frame and the basket which use the metal cart frame as a reinforcing member for the basket. Not only does this provide added strength to the plastic basket, but it allows the basket to be made of materials that would otherwise not be suitable.

In the '774 patent, a metal ring is disposed within a channel extending around the top opening of the upper edges of the basket. The metal ring is provided with a plurality of integral upstanding tabs which are received in complementary openings in the top wall of the channel. The tab and slot arrangement secures the ring within the channel. Similar reinforcing rings may be used with over-the-counter carts (see my U.S. Pat. No. 4,273,346) and with scanner carts (see my U.S. Pat. No. 4,650,199).

Plastic crates, such as plastic milk crates, are also well known in their field. Plastic crates replace wooden and paper crates for transporting, storing and displaying food such as milk cartons. These crates are rectangular and include four side walls and a bottom. The side walls are commonly formed of an open lattice configuration to permit viewing the contents of the crate. The bottom is also formed of an open lattice configuration to prevent accumulation of debris. Various reinforcing structures such as integrally molded ribs are used to strengthen the crates. It is also known, as disclosed in my U.S. Pat. No. 3,390,808, to dispose a metal reinforcing ring within a channel disposed along the top opening of the crate. As with reinforcing rings for shopping carts, the metal ring is provided with upstanding tabs or lugs which project into flanges in the plastic crate to secure the metal ring in position.

However, in both carts and crates, the tab and slot method of securing the reinforcing ring in the top channel suffers numerous disadvantages. Tabs must be formed on the reinforcing ring. A cross-sectionally round ring must be used for the cart basket gate to swing and to complete the back side of the ring. The ring must be formed with dies.

SUMMARY OF THE INVENTION

It is an object of the present invention to provide a cart, crate, or other container having a plastic basket and a reinforcing ring that overcomes the disadvantages associated with tab and groove securing means.

It is another object to provide a reinforcing ring without tabs, that may be bent to shape, that is easier to assemble and dispose in a securing channel, and that is easier to maintain.

These and other objects are attained by the container with a reinforcing ring according to the present invention. The reinforcing ring is preferably formed of a cross-sectionally round wire which is obtained from a coil, straightened, cut, and bent to suitable dimensions. If desired, the reinforcing ring may have its ends welded together and the ring may extend around the entire top opening. The reinforcing ring is disposed within a peripheral outwardly facing channel of the shopping cart basket, crate or other container. The channel includes top and bottom walls and an inner side wall. The reinforcing ring is free of projections that engage the walls of the channel. The channel has retaining ridges and/or a plurality of resilient spaced discrete projections which retain the reinforcing ring and enable the reinforcing ring to be snap-actingly receivable within the channel.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF PREFERRED EMBODIMENTS

Figure 1:
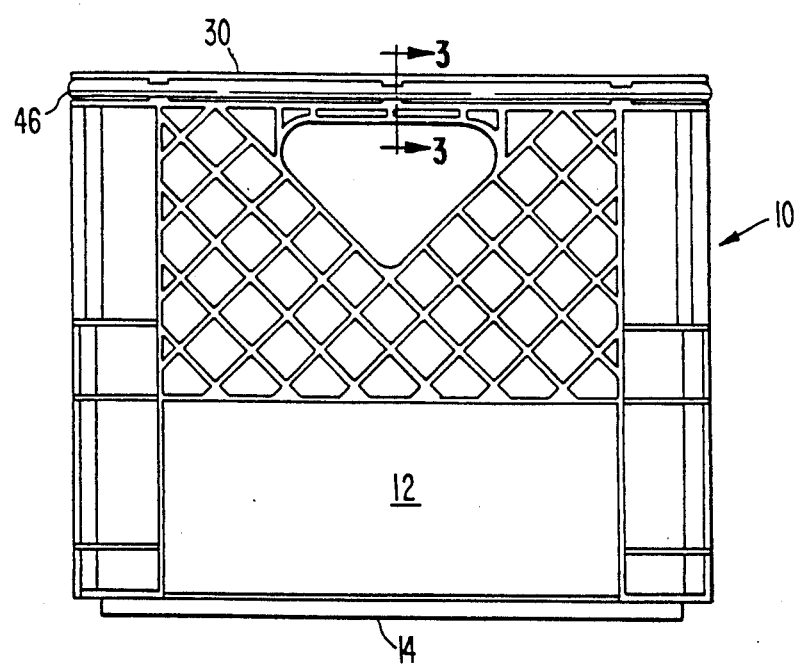
FIG. 1 is a side view of a milk crate illustrating the reinforcing ring in position.
Figure 2:
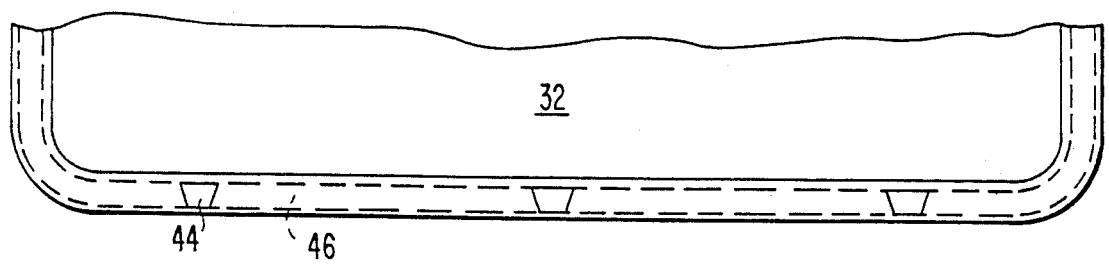
FIG. 2 is a partial top view of the milk crate of FIG. 1.
Figure 3:
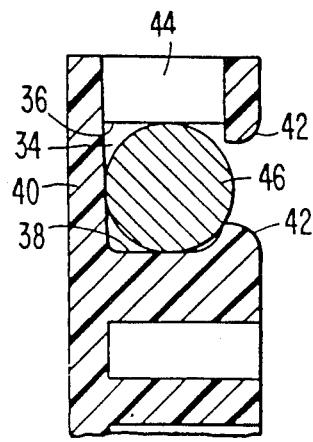
FIG. 3 is a sectional view taken along line 3—3 of FIG. 1.

Referring first to FIGS. 1 and 2, milk crate 10 according to the present invention is shown. Milk crate 10 has four side panels 12 joined to bottom panel 14.

Figure 4:
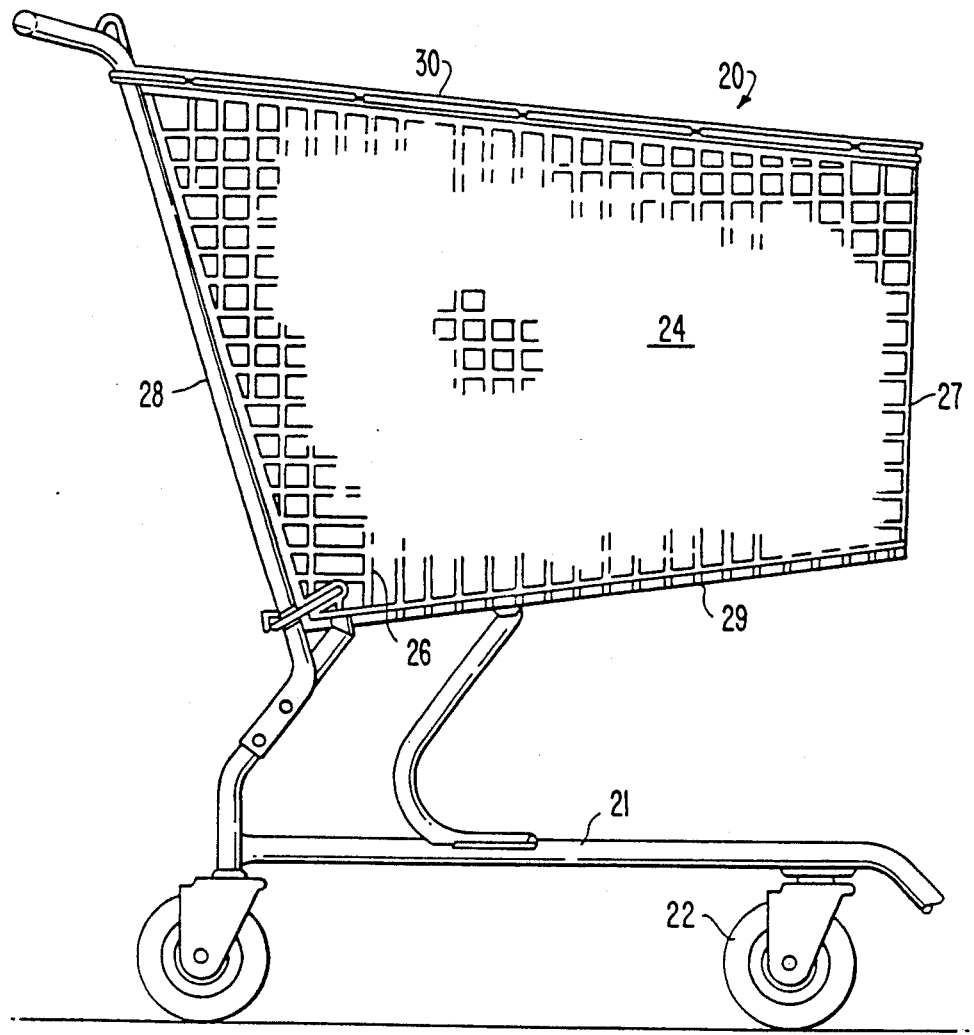
FIG. 4 is a side view of a shopping cart illustrating the reinforcing ring in position.

Referring to FIG. 4, shopping cart 20 according to the present invention is shown. Shopping cars 20 has metal cart frame 21 on which wheels 22 are mounted. Plastic basket 24 is mounted on cart frame 21. Plastic basket 24 includes two side panels 26, front panel 27, back panel 28, and bottom panel 29. Side panels 26, front panel 27, and bottom panel 29 are attached to each other and may be formed integrally. Back panel 28 is optional and is formed as a separate component. Although only a conventional shopping cart is shown, the present invention also may be used with shopping carts of various sizes and configurations, such as, for example, over-the-counter and scanning shopping carts.

The remaining elements of the reinforcing top frame invention are common to both the milk crate and the shopping cart embodiments. These elements also may be used with other plastic containers. Side panels 12 of milk crate 10 and side, front, and back panels 26, 27, 28, respectively, of shopping cart 20 have top edges 30 which define top opening 32 into the container. Top opening 32 of milk crate 10 is substantially rectangular and top opening 32 of shopping cart 20 is substantially trapezoidal.

Disposed below the outer faces of top edges 30 is a substantially rectangular securing channel 34. As shown in FIG. 1, channel 34 extends around the entire periphery although channel 34 need not extend around the total periphery, depending on the amount of required additional strength. Channel 34 has top wall 36 and opposing bottom wall 38, connected by inner side wall 40. Channel 34 is substantially U-shaped.

Channel 34 is provided with a plurality of resilient spaced discrete projections 42 which are molded in and formed integrally with channel 34, and which protrude upwardly from bottom wall 38 and downwardly from top wall 36. Projections 42 partially obstruct the opening into channel 34. Top projections 42 are aligned with and oppose bottom projections 42. Each top projection 42 is mounted opposite a respective bottom projection 42. In one alternate embodiment, channel 34 may be formed with only one continuous projection 42. Continuous projection 42 may be disposed on either top wall 36 or bottom wall 38. In another embodiment only one continuous projection 42 is disposed on either top wall 36 or bottom wall 38.

Figure 5:
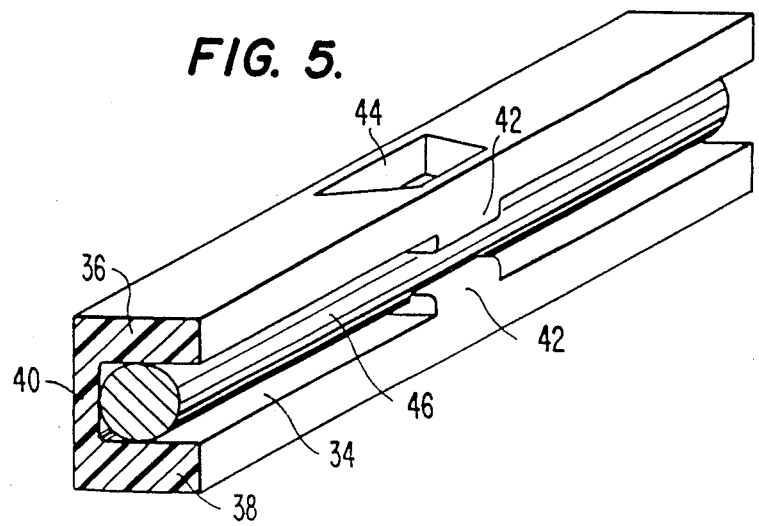
FIG. 5 is a perspective view of the reinforcing ring disposed within its retaining channel.

Channel 34 is also provided with a plurality of quadrilateral openings 44 disposed in top wall 36. Quadrilateral openings 44 are formed to enable the molding of projections 42. The inner lengthwise edge of quadrilateral opening 44 is coplanar with inner side wall 40 as best shown in FIG. 5. The length of the outer lengthwise edge of quadrilateral opening 44 is substantially equal to the length of projections 42. Quadrilateral openings 44 are disposed along top wall 36 at the same locations as projections 42. Quadrilateral openings 44 preferably are shaped as trapezoids. However, any shape will suffice as long as the length of the outer lengthwise edge is shorter than the length of the inner lengthwise edge. Forming the outer lengthwise edge shorter facilitates and simplifies the molding process, enabling portions of the mold to move more freely.

Metal reinforcing ring 46 is disposed within channel 34 to provide strength and rigidity to the lightweight plastic container. Reinforcing ring 46 has a uniform cross section that is preferably circular. Reinforcing ring 46 therefore can be manufactured simply by cutting a length of wire from a coil, straightening the wire, cutting the wire, bending the wire to its required configuration, and welding the ends together (if the wire extends around the entire periphery of top opening 32). In an efficient factory, these operations are automatic and the labor costs in manufacturing reinforcing ring 46 are minimal.

Reinforcing ring 46 is formed so that is has a uniform cross section. Reinforcing ring 46 may alternately be formed so that it has different cross-sectional areas or different cross-sectional configurations along different portions of top edges 30. Nonetheless, even in this embodiment, reinforcing ring 46 has a uniform cross section in the area of projections 42. Thus, reinforcing ring 46 is formed so that it is free of projections that engage—frictionally, matingly, or otherwise—any portion of channel 34. The device for retaining reinforcing ring 46 within channel 34 is disposed on or adjacent channel 34 in the form of projections 42. No additional device is disposed on, or is formed as part of, reinforcing ring 46. Thus, reinforcing ring 46 is snap-actingly received within channel 34 and is held in position by projections 42. Reinforcing ring 46 is totally receivable within channel 34.

Preferably, the maximum clearance between each pair of opposed projections 42 disposed on top and bottom walls 36, 38 is 65% of the height of reinforcing ring 46. Where projections 42 are disposed on one wall of channel 34 only, or do not have an opposing projection 42 on the opposite wall, the clearance between each projection 42 and its opposing wall should also be no greater than 65% of the height of reinforcing ring 46. Also, the width of quadrilateral openings 44 is preferably less than the width of reinforcing ring 46.

Numerous characteristics, advantages, and embodiments of the invention have been described in detail in the foregoing description with reference to the accompanying drawings. However, the disclosure is illustrative only and the invention is not limited to the precise illustrate embodiments. Various changes and modifications may be effected therein by one skilled in the art without departing from the scope or spirit of the invention.

What is claimed is:

1. A reinforced container comprising:
   a plastic basket, said plastic basket having a channel formed by channel first, second and third walls;
   a reinforcing ring positionable in said channel; and
   a projection means on said channel for snap-actingly receiving said reinforcing ring into said channel.

2. The reinforced container of claim 1 wherein said channel is disposed opening outwardly relative to said plastic basket.

3. The reinforced container of claim 1 wherein said plastic basket includes at least one plastic, generally upright panel and said channel is integrally molded with said panel.

4. The reinforced container of claim 3 wherein said projection means is integrally molded with said channel.

5. The reinforced container of claim 1 wherein said projection means comprises a plurality of retainer projections integrally molded with said channel.

6. The reinforced container of claim 1 wherein said channel first wall comprises a channel top wall, said channel second wall comprises a channel bottom wall, and said channel third wall comprises a channel side wall.

7. The reinforced container of claim 6 wherein said projection means comprises a resilient retainer projection formed on one side channel top and bottom walls.

8. The reinforcing container of claim 6 wherein said projection means comprises a first resilient retainer projection formed on said top wall and a second resilient retainer projection formed on said bottom wall.

9. The reinforced container of claim 8 wherein said first and second resilient retainer projections are horizontally aligned.

10. The reinforced container of claim 1 wherein said plastic basket includes a bottom panel and a plurality of plastic, generally upright panels attached to said bottom panel and having top edges defining a basket top opening, and said channel is disposed along said top opening.

* * * * *